Aug. 27, 1957     D. O. ELLING     2,804,222

MOUNTING CARRIAGE FOR VEHICLE WHEELS

Filed Jan. 13, 1954

INVENTOR.
Delmar O. Elling
BY
ATTORNEY.

//www.w3.org/2000/svg" viewBox="0 0 100 100">

United States Patent Office 2,804,222
Patented Aug. 27, 1957

2,804,222

MOUNTING CARRIAGE FOR VEHICLE WHEELS

Delmar O. Elling, Pattonsburg, Mo.

Application January 13, 1954, Serial No. 403,685

2 Claims. (Cl. 214—330)

This invention relates to accessories for use with automobiles or other vehicles and more particularly to a mounting carriage for facilitating the removal and replacement of vehicle wheels, the primary object being to provide a novel wheel support for the wheel capable of holding the latter elevated to the proper height for alignment with its mounting lugs.

The difficulty of mounting vehicle wheels on modern-day automobiles, tractors and other mobile equipment is well known. The weight of such appliances, together with the tendency of the lugs to rotate when attempt is made to align the same with the holes of the wheel, frequently presents an unsurmountable problem and, therefore, it is the most important object of the present invention to provide means to simplify the task for all users of vehicular equipment.

An important object of the present invention is to provide a mounting carriage for vehicle wheels that includes a base plate upon which is rotatably mounted a pair of spaced-apart cones positioned so that the uppermost level of the cones is on a slope whereby when the wheel is placed thereon, its height may be adjusted so as to align the holes thereof with the mounting lugs.

Other objects include such important details of construction as the provision of upstanding ears on the plate for rotatably receiving the parallel shafts of the cones and the provision of a plurality of circumferential ribs on the cones to prevent slippage of the wheel when properly positioned thereon.

Figure 1:
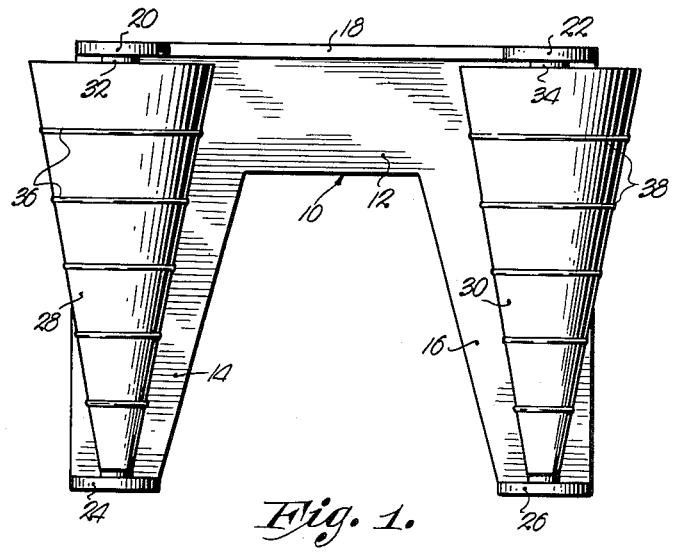
Figure 1 is a top plan view of a mounting carriage for vehicle wheels made according to my present invention.

When the mounting carriage forming the subject matter of the present invention is placed in use, it must be capable of freely sliding along the ground and, therefore, there is provided a substantially U-shaped plate broadly designated by the numeral 10 and having a flat, smooth lowermost surface.

There is presented in plate 10 a bight 12 and a pair of elongated legs 14 and 16, bight 12 having an upstanding flange 18 coextensive with its rearmost, longitudinal edge. A pair of ears 20 and 22 extending upwardly from the flange 18 to cooperate with upstanding ears 24 and 26 on the free ends of the legs 14 and 16 respectively and rotatably mounting a pair of cones 28 and 30.

Cones 28 and 30 may be solid or hollow as desired and are supported by shafts 32 and 34 respectively. Shaft 32 interconnects the ears 20 and 24 and rotatably receives the cone 28, whereas shaft 34 joins ears 22 and 26 and supports the cone 30 in the same manner.

Figure 2:
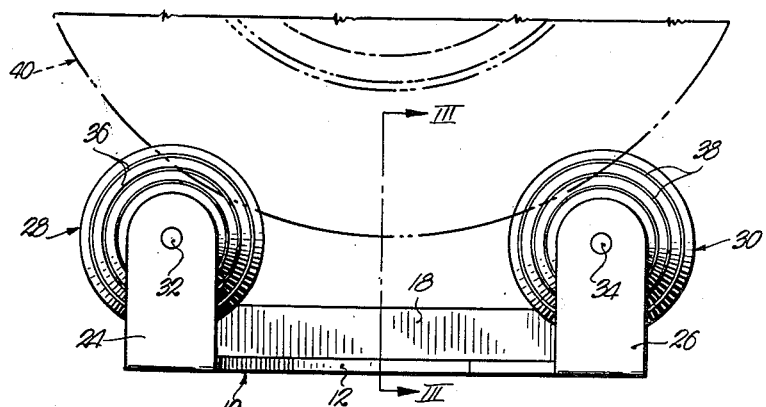
Fig. 2 is an end elevational view thereof showing a vehicle wheel supported thereby.
Figure 3:
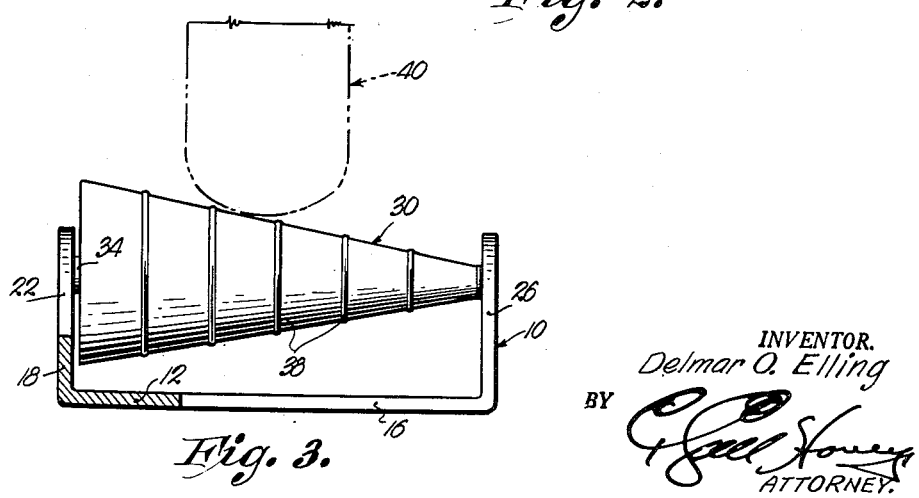
Fig. 3 is a cross-sectional view taken on line III—III of Fig. 2.

Shafts 32 and 34 are preferably parallel and may be disposed horizontally as seen in Fig. 3 or at any desired angle so long as the uppermost levels of the cones are in a common plane that slopes upwardly as the base ends of the cones 28 and 30, adjacent ears 20 and 22, are approached. In this respect, the same results may be had by lowering the apex ends of the cones 28 and 30, thereby lessening the necessary diameters thereof. Cones 28 and 30 may be roughened in any suitable manner such as by provision of a plurality of circumferential ribs 36 and 38 to prevent slippage of wheel 40, ribs 36 and 38 being spaced along the cones 28 and 30 in the manner shown by Figs. 2 and 3 of the drawings.

As is well known, when wheel 40 is to be mounted on a mobile vehicle, the holes thereof (not shown) which receive the mounting lugs must align properly with the latter and this requires therefore, that the wheel 40 be held at a proper height. In using the mounting carriage hereinabove described and shown in the drawing, it is but necessary to place the wheel 40 upon the cones 28 and 30 therebetween and to shift the wheel 40 along the cones 28 and 30 until the wheel 40 is at the desired and necessary height.

Manifestly, as wheel 40 is shifted upwardly along the cones 28 and 30 toward their base ends, wheel 40 will be elevated and as soon as it is properly positioned as to height, base plate 10 may be shifted along the ground until the wheel 40 receives its mounting lugs. By virtue of the fact that the cones 28 and 30 are also rotatable, it is a simple matter for the user to rotate the wheel 40 to align the holes thereof with the lugs and to slip the wheel in place. Thereupon, the plate 10 may be shifted inwardly from beneath the wheel 40 and, by virtue of its relatively light, compact nature, the mounting carriage may be placed in the trunk compartment of the automobile for subsequent use.

It is clear also that the device is usable in the same manner for removing wheels 40 and in this respect, after wheel 40 is elevated through use of a jack in the usual manner, the cones 28 and 30 may be placed beneath the wheel 40 in supporting relationship thereto and it is not even necessary for the user to lift the wheel during removal.

It is to be understood that the mounting carriage hereof is not restricted in use to automobile wheels but will have use in the removal and remounting of truck and tractor wheels as well as the wheels of many other vehicles. The overall size of the unit may be increased for tractor use and the lengths of the cones may be increased if desired, for multiple wheels of trucks, buses and the like.

Therefore, while details of construction such as above set forth, may be varied within the spirit of the present invention, it is desired to be limited only by the scope of the appended claims.

Having thus described the invention what is claimed as new and desired to be secured by Letters Patent is:

1. Mounting structure for vehicle wheels comprising a substantially U-shaped, base plate having a bight and a pair of legs, each leg having a fixed, upstanding ear; a pair of fixed, upstanding ears on said bight; a pair of parallel, horizontal shafts connecting the ears of the legs with the ears of the bight; and an elongated cone mounted for rotation on the longitudinal axis thereof on each shaft respectively, each cone being provided with a plurality of spaced, circumferential ribs and being substantially greater in length than the width of a wheel whereby to permit height adjustments of a wheel by movement thereof along the cones.

2. Structure for supporting a pneumatically tired wheel as the latter is mounted on a vehicle, said structure comprising a substantially U-shaped base plate having a bight and a pair of legs, each leg having a fixed upstanding ear; a pair of fixed upstanding ears on said bight; a pair of elongated wheel-supporting members, the latter being tapered longitudinally to present a conical configuration;

and means mounting each member respectively on and between an ear of the bight and the ear of the corresponding leg for rotation on the longitudinal axis thereof with said axes in spaced, fixed parallelism, said members being provided with rough surfaces for holding a wheel against slippage and having uppermost edges disposed in a common plane sloping upwardly as one end of the members is approached, the length of the members being substantially greater than the width of a wheel whereby to permit height adjustments of a wheel by movement thereof along the length of the conical members.

References Cited in the file of this patent

UNITED STATES PATENTS

| | | |
|---|---|---|
| 2,345,458 | Caron | Mar. 28, 1944 |
| 2,613,084 | Burch | Oct. 7, 1952 |
| 2,640,615 | Wedel | June 2, 1953 |

FOREIGN PATENTS

| | | |
|---|---|---|
| 642,021 | Germany | Feb. 20, 1937 |